(12) United States Patent
Yoshida et al.

(10) Patent No.: US 6,339,581 B1
(45) Date of Patent: Jan. 15, 2002

(54) DISC PLAYER HAVING A PREPIT DETECTING CIRCUIT

(75) Inventors: Masayoshi Yoshida; Yoshitaka Shimoda; Naoharu Yanagawa; Shinichi Nagahara, all of Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/425,178

(22) Filed: Oct. 22, 1999

(30) Foreign Application Priority Data

Oct. 23, 1998 (JP) .......................................... 10-302291

(51) Int. Cl.$^7$ ................................................ G11B 7/00
(52) U.S. Cl. ............................ 369/124.14; 369/124.12; 369/124.15
(58) Field of Search .......................... 369/44.25, 44.26, 369/44.34, 44.41, 44.32, 47.17, 47.25, 47.27, 47.28, 53.31, 53.44, 124.12, 124.14, 124.15

(56) References Cited

U.S. PATENT DOCUMENTS

| | | | | |
|---|---|---|---|---|
| 5,073,880 A | * | 12/1991 | Maeda et al. | 369/44.34 X |
| 6,160,773 A | * | 12/2000 | Maegawa et al. | 369/44.41 X |
| 6,181,657 B1 | * | 1/2001 | Kuroda et al. | 369/44.41 X |

* cited by examiner

Primary Examiner—Paul W. Huber
(74) Attorney, Agent, or Firm—Morgan, Lewis & Bockius LLP (57) ABSTRACT

A disc player having a prepit detecting circuit which can correctly detect prepits even if phases or amplitude levels of a plurality of read signals read out from a recording disc are deviated from each other. A phase difference between a first read signal and a second read signal read out by first and second reading elements arranged in two regions divided along the direction of recording tracks of a recording disc is detected. A first phase correction read signal is obtained by adjusting the phase of the first read signal by an amount according to the phase difference. A differential value between the first phase correction read signal and the second read signal is outputted as a prepit detection signal.

7 Claims, 8 Drawing Sheets

FIG. 1

DISC OUTER
RIM SIDE

LPP TRACING PERIOD

DISC PLAYER HAVING A PREPIT DETECTING CIRCUIT

BACKGROUND OF THE INVENTION

1. Field of the Invention

The invention relates to a disc player for recording and reproducing information to and from a recording disc.

2. Description of Related Art

Nowadays, DVD-R as a WORM (write-once) type DVD (Digital Versatile Disc) and DVD-R/W (or DVD-RAM) as a rewritable DVD are put into practical use.

Figure 1:
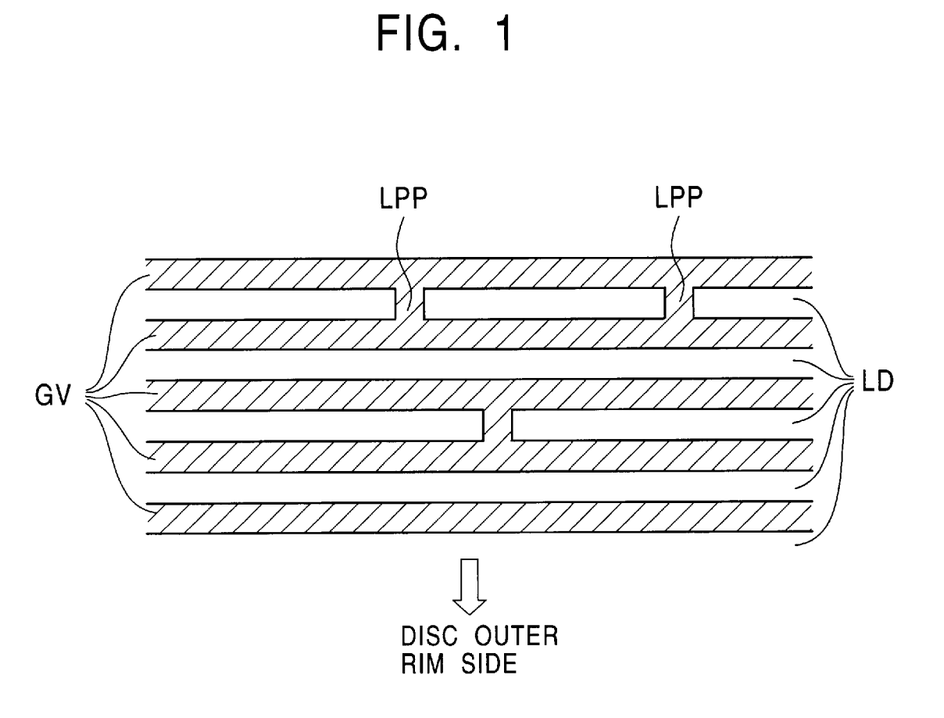
FIG. 1 is a diagram showing a recording surface of a DVD.

FIG. 1 is a diagram showing a recording surface of a DVD such as a DVD-R or DVD-R/W in which information data can be recorded by a user.

As shown in FIG. 1, grooves GV and lands LD serving as recording tracks are alternately formed spirally or concentrically on the recording surface of the DVD. In this configuration, a pit train representing the information data (audio data, video data, and computer data) is formed on the groove GV. Land prepits LPP have previously been intermittently formed on the lands LD (before the information data is written). The land prepits LPP are pits which indicate address information to recognize the position on the disc and are used to perform a phase control when the information recording is performed.

To record information data to the DVD-R or DVD-R/W (hereinafter, simply referred to as a recording disc), it is necessary to read the recording information from the recording disc, detect the land prepits LPP, and recognize the position at the time of recording.

Therefore, DVD players for recording and reproducing information data to/from the recording disc are provided with a prepit detecting circuit to detect the land prepits LPP based on a read signal read out from the recording disc.

Figure 2:
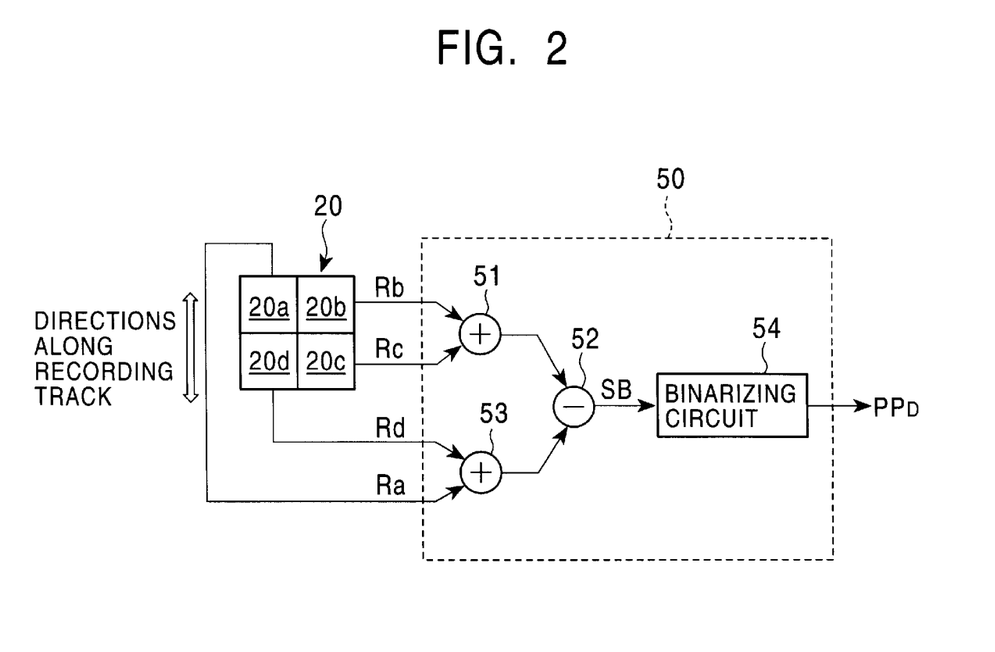
FIG. 2 is a diagram showing an internal construction of a conventional prepit detecting circuit.

FIG. 2 is a diagram showing the structure of such a prepit detecting circuit.

In FIG. 2, a 4-split photodetector 20 is constituted by four independent photoelectric converting elements 20a to 20d. These elements 20a to 2d have functions of receiving reflection light by an information reading spot irradiated from a reading laser beam generator (not shown) toward the recording surface of the recording disc, converting it into electric signals, and outputting them as read signals $R_a$ to $R_d$. A photosensitive surface of the 4-split photodetector is divided into four surfaces in the direction along the recording tracks (grooves GV) of the recording disc and the direction perpendicular to the recording tracks and the divided four photosensitive surfaces are arranged on the photoelectric converting elements 20a to 20d, respectively.

An adder 51 in a prepit detecting circuit 50 adds the read signals $R_b$ and $R_c$ from the photoelectric converting elements 20b and 20c, obtains a summed read signal $(R_b+R_c)$, and supplies it to a subtractor 52. An adder 53 adds the read signals $R_a$ and $R_d$ from the photoelectric converting elements 20a and 20d, obtains a summed read signal $(R_a+R_d)$, and supplies it to the subtractor 52. The subtractor 52 obtains a value by subtracting the summed read signal $(R_b+R_c)$ from the summed read signal $(R_a+R_d)$ and supplies it as a differential value SB to a binarizing circuit 54. The binarizing circuit 54 binarizes the differential value SB based on a predetermined threshold value and generates the binarized value as a prepit detection signal $PP_D$.

Figure 3:
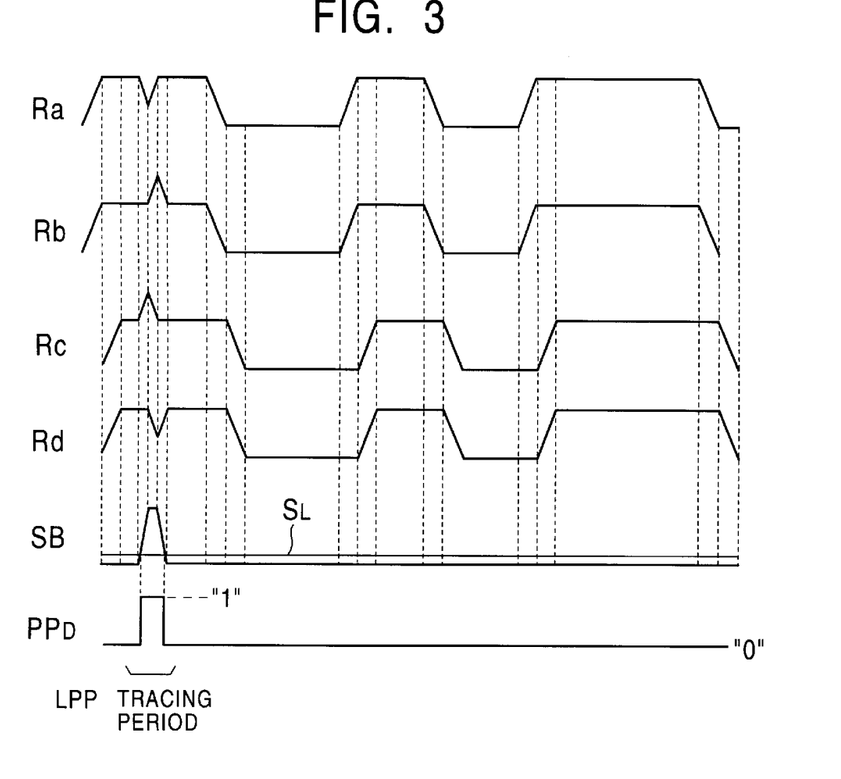
FIG. 3 is a diagram showing an example of a waveform of each of read signals $R_a$ to $R_d$.
Figure 4:
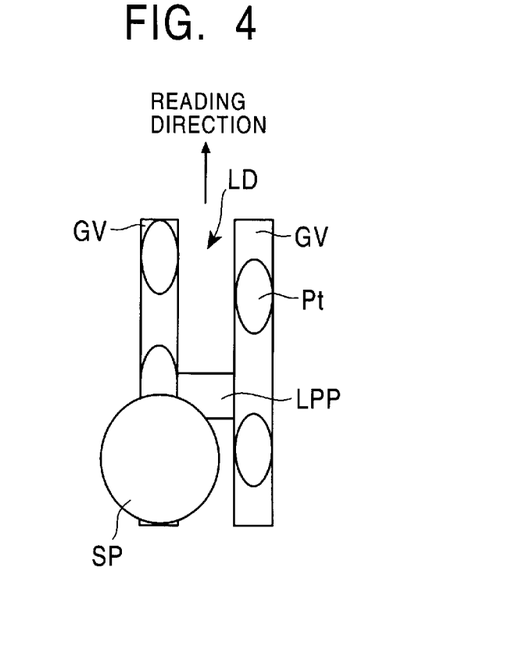
FIG. 4 is a diagram showing the operation of the conventional prepit detecting circuit.

FIG. 3 is a diagram showing the read signals $R_a$ to $R_d$ obtained when an information reading spot SP traces the land prepit LPP formed on the recording disc in a state as shown in FIG. 4 and also showing the internal operation of the prepit detecting circuit 50.

When the read signals $R_a$ to $R_d$ as shown in FIG. 3 are supplied to the prepit detecting circuit 50, the subtractor 52 generates the differential value SB whose level rises only for a tracing period of time of the land prepit LPP. The binarizing circuit 54 binarizes the differential value SB by a threshold value $S_L$ as shown in the diagram, thereby generating the prepit detection signal $PP_D$ which is set to the logic level "1" only for the tracing period of time of the land prepit LPP.

In short, by using the structure as shown in FIG. 2, the prepit detecting circuit 50 detects the land prepits LPP on the basis of the read signals $R_a$ to $R_d$.

In the structure shown in FIG. 2, however, the prepit cannot be correctly detected unless phases and amplitude levels of the read signals $R_a$ to $R_d$ are not matched each other.

Figure 5:
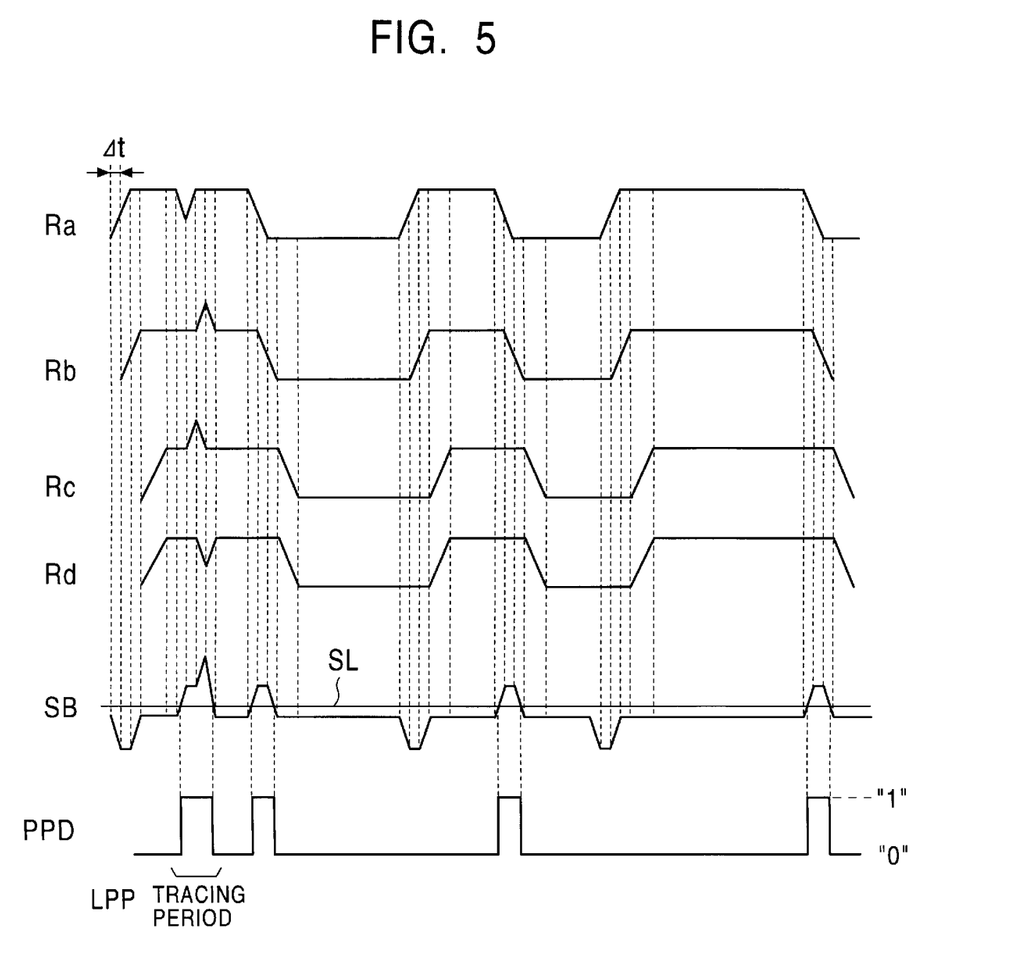
FIG. 5 is a diagram showing a waveform example of each of the read signals $R_a$ to $R_d$ when a phase advance occurs in the read signal $R_a$ and also showing the operation of the conventional prepit detecting circuit according to those waveforms.

For example, if a phase advance Δt occurs in only the read signal $R_a$ among the read signals $R_a$ to $R_d$ as shown in FIG. 5, the differential value SB based on the read signals $R_a$ to $R_d$ causes a level increase even in a period of time during which the land prepit LPP is not traced. If it is binarized by the threshold value $S_L$, therefore, as shown in FIG. 5, the prepit detection signal $PP_D$ at the logic level "1" is erroneously generated even for the period of time during which the land prepit LPP is not traced.

Figure 6:
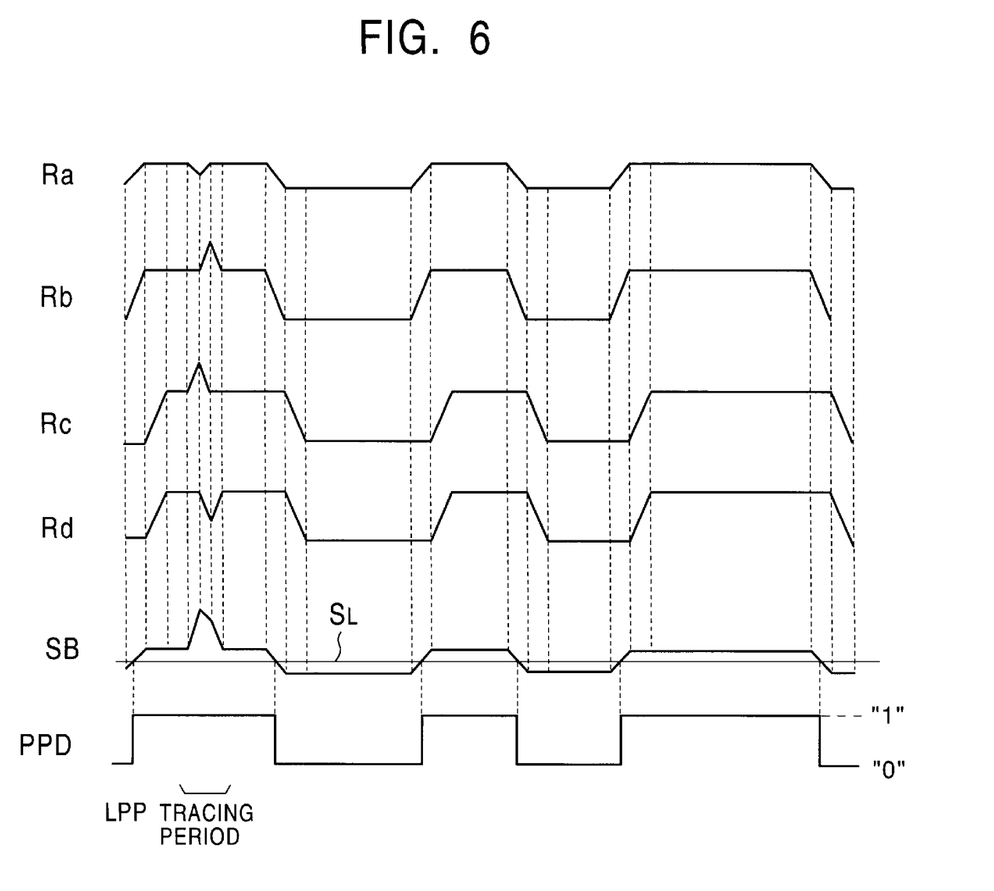
FIG. 6 is a diagram showing a waveform example of each of the read signals $R_a$ to $R_d$ when a level drop occurs in the read signal $R_a$ and also showing the operation of the conventional prepit detecting circuit according to those waveforms.

The operation similar to that mentioned above is performed also in cases in which, for example, an amplitude of the read signal $R_a$ among the read signals $R_a$ to $R_d$ is lower than those of the other read signals as shown in FIG. 6.

OBJECTS AND SUMMARY OF THE INVENTION

The invention has been made in view of the above problems and it is an object of the invention to provide a disc player having a prepit detecting circuit which can correctly detect a prepit even if phases or amplitude levels of a plurality of read signals read out from a recording disc are deviated from each other in a way that is not acceptable to conventional prepit detection circuits.

According to the invention, there is provided a disc player comprising: reading means for obtaining a read signal by reading recording information from a recording disc; and a prepit detecting circuit for detecting prepits which have previously been formed on the recording disc based on the read signal and generating a prepit detection signal, wherein the reading means includes first and second reading elements arranged in two regions divided along the direction of recording tracks of the recording disc, and the prepit detecting circuit comprises phase detecting means for detecting a phase difference between a first read signal read out by the first reading element and a second read signal read out by the second reading element, phase correcting means for obtaining a first phase correction read signal by correcting the phase of the first read signal by an amount corresponding to the phase difference, and a subtractor for generating a differential value between the first phase correction read signal and the second read signal as a prepit detection signal.

DETAILED DESCRIPTION OF THE PREFERRED EMBODIMENTS

An embodiment of the invention will now be described in detail hereinafter with reference to the accompanying drawings.

Figure 7:
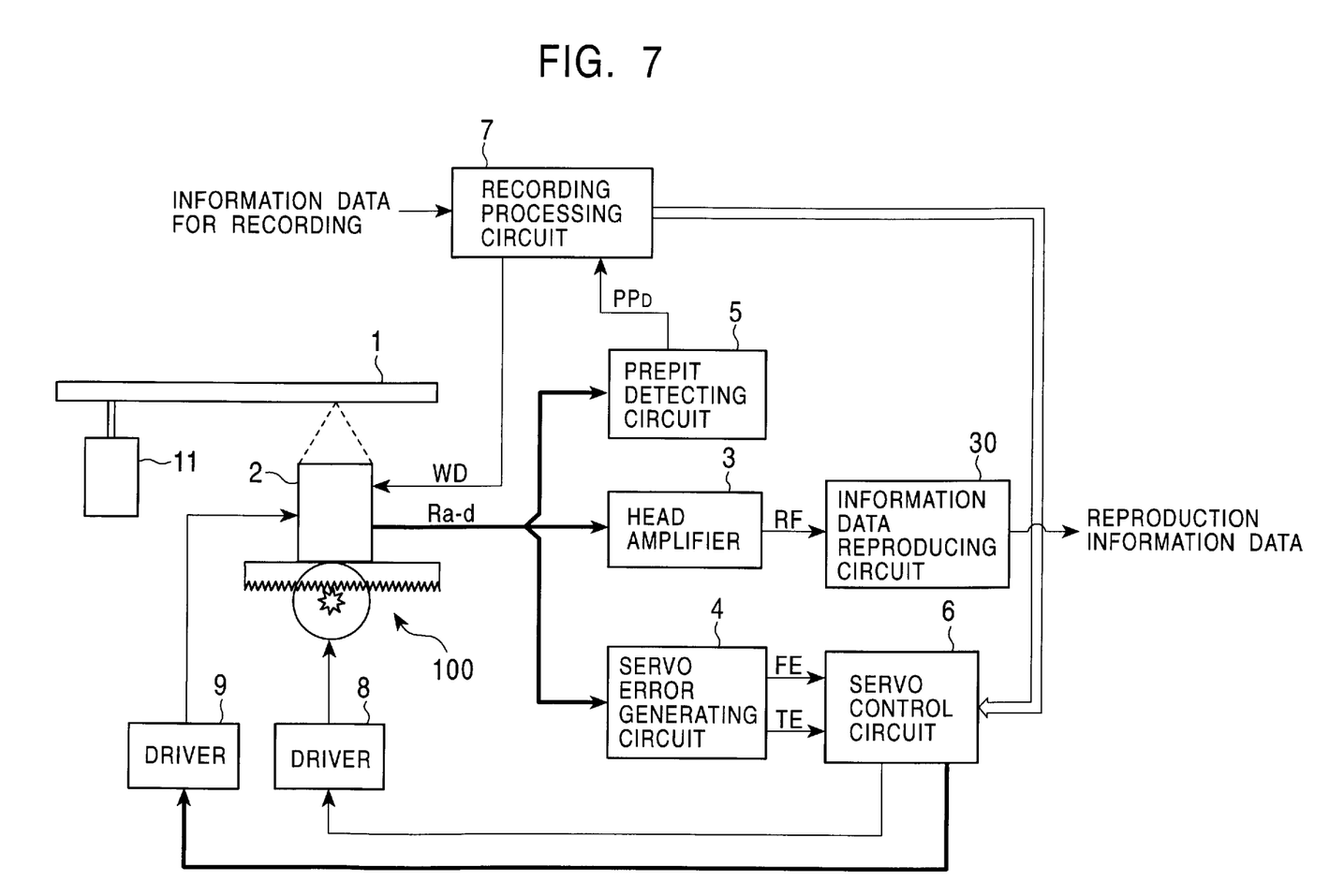
FIG. 7 is a diagram showing the structure of a disc player according to the invention.

FIG. 7 is a diagram showing the structure of a disc player according to the invention.

In FIG. 7, a writable recording disc 1 such as a DVD-R/W (or DVD-RAM) or DVD-R is rotated by a spindle motor 11.

A recording/reproducing head 2 has: a reading laser beam generator (not shown) for irradiating a reading laser beam onto a recording surface of the recording disc 1 which is rotated by the spindle motor 11 at the time of the reproducing operation, thereby allowing an information reading spot to be formed; and the 4-split photodetector 20 for receiving reflection light due to an irradiation of the reading laser beam and converting it into electric signals. As shown in FIG. 2, the 4-split photodetector 20 is constituted by the four photoelectric converting elements 20a to 20d on which four photosensitive surfaces divided in the direction along recording tracks (grooves GV) of the recording disc 1 and the direction perpendicular to the recording tracks are arranged. The photoelectric converting elements 20a to 20d receive the reflection light by the information reading spot, convert it into the electric signals, and generate the electric signals as read signals $R_a$ to $R_d$, respectively. The recording/reproducing head 2 has: a tracking actuator (not shown) for deviating a forming position of the information reading spot in the disc radial direction; and a focusing actuator (not shown) for adjusting a focal position of the information reading spot.

Further, the recording/reproducing head 2 has a writing laser beam generator (not shown) for forming a recording pit train by irradiating the writing laser beam according to a recording data signal WD supplied from a recording processing circuit 7, which will be explained later, onto the recording track on the recording disc 1 at the time of the recording operation of the disc player.

A head amplifier 3 obtains the sum of the read signals $R_a$ to $R_d$ supplied from the recording/reproducing head 2, amplifies it to a desired level, and supplies the obtained signal as an information read signal RF to an information data reproducing circuit 30. The information data reproducing circuit 30 binarizes the information read signal RF and, thereafter, performs a demodulation and an error correcting process, thereby reconstructing the data recorded on the recording disc 1. Further, by performing an information (video image, audio signal, computer data) decoding process to the data, the information data reproducing circuit reproduces the information data and outputs it as reproduction information data. Based on the read signals $R_a$ to $R_d$ supplied from the recording/reproducing head 2, a servo error generating circuit 4 generates a focusing error signal FE and a tracking error signal TE and supplies them to a servo control circuit 6. The servo control circuit 6 generates a focusing drive signal FD based on the focusing error signal FE and supplies it to the recording/reproducing head 2 through a driver 9. The focusing actuator installed in the recording/reproducing head 2 thus adjusts a focal position of the information reading spot in response to the focusing drive signal FD. The servo control circuit 6 also generates a tracking drive signal based on the tracking error signal TE and supplies it to the recording/reproducing head 2 through a driver 9. The tracking actuator installed in the recording/reproducing head 2, thus, deviates the forming position of the information reading spot in the disc radial direction by a distance corresponding to a drive current by the tracking drive signal. The servo control circuit 6 further generates a slider drive signal based on the tracking error signal TE and supplies it to a slider 100 through a driver 8. The slider 100, thus, moves the recording/reproducing head 2 in the disc radial direction at a speed according to a drive current by the slider drive signal.

Based on the read signals $R_a$ to $R_d$ supplied from the recording/reproducing head 2, the prepit detecting circuit 5 detects the land prepit LPP as shown in FIG. 2, generates the prepit detection signal $PP_D$, and supplies it to the recording processing circuit 7. The recording processing circuit 7 performs a desired recording modulating process to the recording information data as a recording target, generates the recording data signal WD, and supplies it to the recording/reproducing head 2. Further, the recording processing circuit 7 recognizes the current recording position (on the recording surface of the recording disc 1) of the recording/reproducing head 2 based on the prepit detection signal $PP_D$ and supplies a control signal to the servo control circuit 6 so as to allow the recording/reproducing head 2 to jump the recording tracks from the recording position to a desired recording position.

Figure 8:
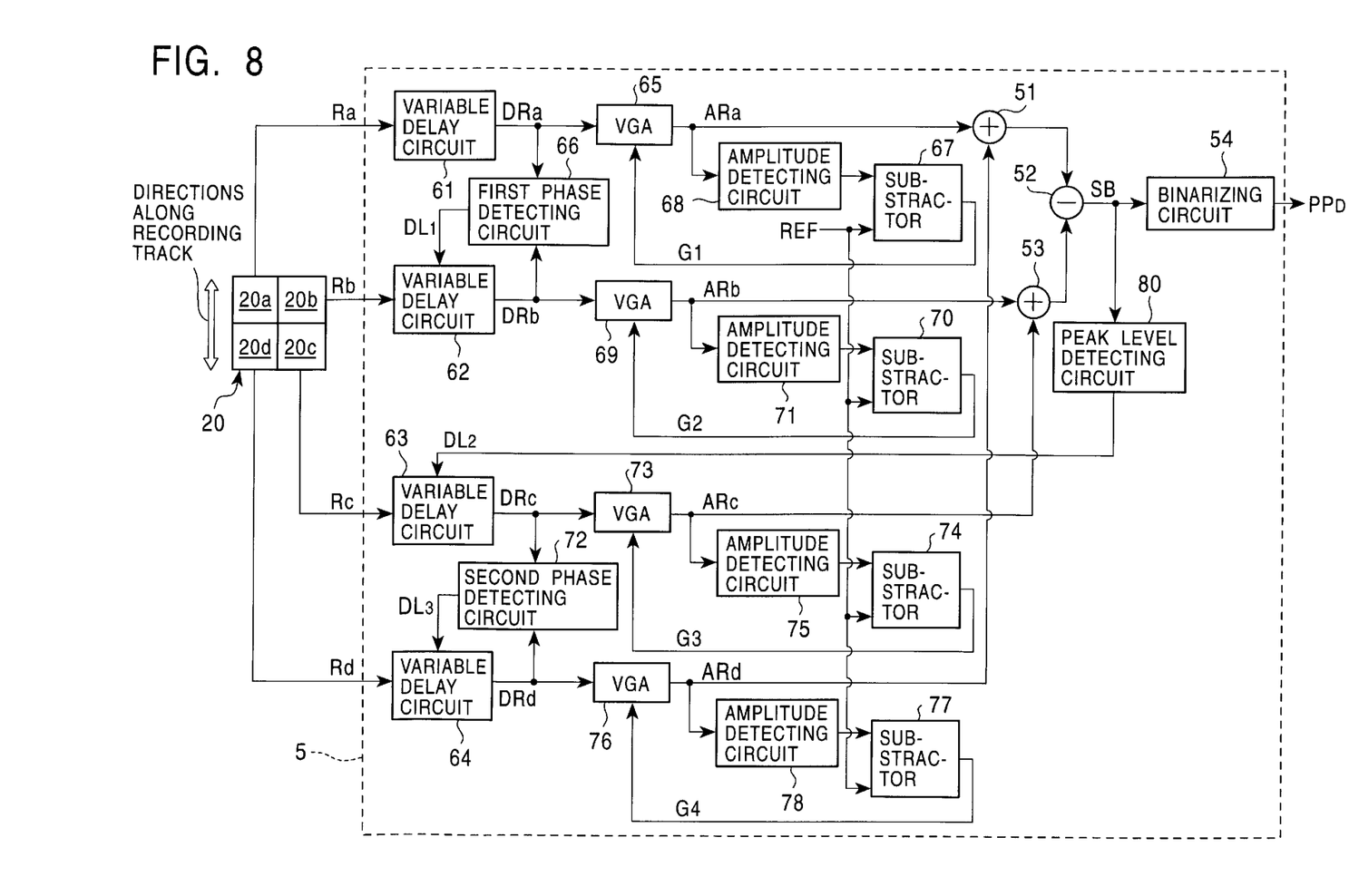
FIG. 8 is a diagram showing an internal structure of a prepit detecting circuit 5 according to the invention.

FIG. 8 is a diagram showing an internal structure of the prepit detecting circuit 5 according to the invention.

In FIG. 8, the read signals $R_a$ to $R_d$ generated from the 4-split photodetector 20 mounted in the recording/reproducing head 2 are supplied to variable delay circuits 61 to 64 of the prepit detecting circuit 5, respectively.

The variable delay circuit 61 delays the read signal $R_a$ supplied from the photoelectric converting element 20a of the 4-split photodetector 20 by a predetermined time and supplies the delayed signal as a delayed read signal $DR_a$ to each of a variable gain amplifier 65 and a first phase detecting circuit 66. The predetermined time is a time corresponding to the maximum phase deviation amount that is presumed in the case where the read signal $R_a$ has a phase advance for the other read signals $R_b$ to $R_d$. The delay setting of the variable delay circuit 61 is, for example, preliminarily performed at the time of shipping of a product of the disc player.

The variable gain amplifier 65 adjusts an amplitude level by amplifying the delayed read signal $DR_a$ by a gain according to an amplitude error value G1 supplied from a subtractor 67, which will be explained later, and supplies the resultant signal as an amplitude adjustment read signal $AR_a$ to each of the adder 51 and an amplitude detecting circuit 68. The amplitude detecting circuit 68 successively detects a maximal value and a minimal value in the amplitude adjustment read signal $AR_a$ and supplies an amplitude level (amplitude level of the amplitude adjustment read signal $AR_a$) obtained by a difference between them to the subtractor 67. By subtracting a predetermined reference value REF from the amplitude level, the subtractor 67 obtains an amplitude error for the reference value REF and supplies it as an amplitude error value G1 to the variable gain amplifier 65.

That is, the variable gain amplifier 65 adjusts the amplitude level for the delayed read signal $DR_a$ so that the amplitude level of the amplitude adjustment read signal $AR_a$ is always substantially equal to the reference value REF.

The variable delay circuit 62 delays the read signal $R_b$ supplied from the photoelectric converting element 20b of the 4-split photodetector 20 by a time corresponding to a delay time signal $DL_1$ supplied from the first phase detecting circuit 66 and supplies the delayed signal as a delayed read signal $DR_b$ to each of a variable gain amplifier 69 and the first phase detecting circuit 66.

The first phase detecting circuit 66 generates the signal corresponding to a phase difference between the delayed read signals $DR_a$ and $DR_b$ as a delay time signal $DL_1$. By delaying the read signal $R_b$ by the time corresponding to the delay time signal $DL_1$, the variable delay circuit 62 operates as phase correcting means for correcting the phase deviation occurring between the delayed read signals $DR_a$ and $DR_b$.

The variable gain amplifier 69 adjusts an amplitude level by amplifying the delayed read signal $DR_b$ by a gain according to an amplitude error value G2 supplied from a subtractor 70, which will be explained later, and supplies the resultant signal as an amplitude adjustment read signal $AR_b$ to each of the adder 53 and an amplitude detecting circuit 71. The amplitude detecting circuit 71 successively detects a maximal value and a minimal value in the amplitude adjustment read signal $AR_b$ and supplies an amplitude level (amplitude level of the amplitude adjustment read signal $AR_b$) obtained by a difference between them to the subtractor 70. By subtracting the predetermined reference value REF from the amplitude level, the subtractor 70 obtains an amplitude error for the reference value REF and supplies it as an amplitude error value G2 to the variable gain amplifier 69.

Briefly, the variable gain amplifier 69 adjusts the amplitude level for the delayed read signal $DR_b$ so that the amplitude level of the amplitude adjustment read signal $AR_b$ is always equal to the reference value REF.

The variable delay circuit 63 delays the read signal RC supplied from the photoelectric converting element 20c of the 4-split photodetector 20 by a time corresponding to a delay time signal $DL_2$ supplied from a peak level detecting circuit 80, which will be explained later, and supplies the delayed signal as a delayed read signal $DR_c$ to each of a variable gain amplifier 73 and a second phase detecting circuit 72.

The variable gain amplifier 73 adjusts an amplitude level by amplifying the delayed read signal $DR_c$ by a gain according to an amplitude error value G3 supplied from a subtractor 74, which will be explained later, and supplies the resultant signal as an amplitude adjustment read signal $AR_c$ to each of the adder 53 and an amplitude detecting circuit 75.

The amplitude detecting circuit 75 successively detects a maximal value and a minimal value in the amplitude adjustment read signal $AR_c$ and supplies an amplitude level (amplitude level of the amplitude adjustment read signal $AR_c$) obtained by a difference between them to the subtractor 74. By subtracting the predetermined reference value REF from the amplitude level, the subtractor 74 obtains an amplitude error for the reference value REF and supplies it as an amplitude error value G3 to the variable gain amplifier 73.

That is, the variable gain amplifier 73 adjusts the amplitude level for the delayed read signal $DR_c$ so that the amplitude level of the amplitude adjustment read signal $AR_c$ is always equal to the reference value REF.

The variable delay circuit 64 delays the read signal $R_d$ supplied from the photoelectric converting element 20d of the 4-split photodetector 20 by a time corresponding to a delay time signal $DL_3$ supplied from the second phase detecting circuit 72 and supplies the delayed signal as a delayed read signal $DR_d$ to each of a variable gain amplifier 76 and the second phase detecting circuit 72.

The second phase detecting circuit 72 detects a phase difference between delayed read signals $DR_c$ and $DR_d$ based on a difference between the signal levels of them and generates the signal corresponding to the detected phase difference as a delay time signal $DL_3$. That is, by delaying the read signal $R_d$ by the time corresponding to the delay time signal $DL_3$, the variable delay circuit 64 operates as phase correcting means for correcting the phase deviation occurring between the delayed read signals $DR_c$ and $DR_d$.

The variable gain amplifier 76 adjusts an amplitude level by amplifying the delayed read signal $DR_d$ by a gain according to an amplitude error value G4 supplied from a subtractor 77, which will be explained later, and supplies the resultant signal as an amplitude adjustment read signal $AR_d$ to each of the adder 51 and an amplitude detecting circuit 78. The amplitude detecting circuit 78 successively detects a maximal value and a minimal value in the amplitude adjustment read signal $AR_d$ and supplies an amplitude level (amplitude level of the amplitude adjustment read signal $AR_d$) obtained by a difference between them to the subtractor 77. By subtracting the predetermined reference value REF from the amplitude level, the subtractor 77 obtains an amplitude error for the reference value REF and supplies it as an amplitude error value G4 to the variable gain amplifier 76.

That is, the variable gain amplifier 76 adjusts the amplitude level for the delayed read signal $DR_d$ so that the amplitude level of the amplitude adjustment read signal $AR_d$ is always substantially equal to the reference value REF.

The adder 51 adds the amplitude adjustment read signals $AR_a$ and $AR_d$ and supplies a resultant addition signal ($AR_a + AR_d$) to the subtractor 52. The adder 53 adds the amplitude adjustment read signals $AR_b$ and $AR_c$ and supplies a resultant addition signal ($AR_b + AR_c$) to the subtractor 52. The subtractor 52 obtains a difference between the addition signal ($AR_a + AR_d$) and the addition signal ($AR_b + AR_c$) and supplies it as a differential value SB to each of the binarizing circuit 54 and peak level detecting circuit 80.

The peak level detecting circuit 80 detects the maximal value in the differential value SB as a value corresponding to the prepit signal component and supplies the delay time signal $DL_3$ corresponding to the maximal value to the variable delay circuit 63. The variable delay circuit 63, consequently, delays the read signal $R_c$ by the time corresponding to the delay time signal $DL_2$ so as to maximize the signal level of the prepit signal component in the differential value SB. The binarizing circuit 54 binarizes the differential value SB on based on a predetermined threshold value and generates a resultant signal as a prepit detection signal $PP_D$.

The operation of the prepit detecting circuit 5 shown in FIG. 8 will be described below.

First, a phase difference between the delayed read signals $DR_a$ and $DR_b$ after they passed through the variable delay circuits 61 and 62 is detected by the first phase detecting circuit 66. The delay amount of the variable delay circuit 62 is adjusted so as to reduce the phase difference toward "0". The delay amount of the variable delay circuit 63 is adjusted so as to maximize a peak value (namely, signal level corresponding to the prepit signal component) of the differential value SB generated from the subtractor 52. By this adjustment, the delay amount is adjusted so that a phase relation between $DR_a$ serving as a reference and $DR_c$ approaches a predetermined relation as shown in FIG. 3. A phase difference between the delayed read signals $DR_c$ and $DR_d$ after they passed through the variable delay circuits 63 and 64 is detected by the second phase detecting circuit 72. The delay amount of the variable delay circuit 64 is adjusted so as to reduce the phase difference toward "0".

By the phase correction control as mentioned above, the phases of the read signals $R_a$ to $R_d$ supplied from the photoelectric converting elements 20a to 20d of the 4-split photodetector 20 are made generally equal to each other. A margin, consequently, at the time of the binarizing process in the binarizing circuit 54 increases and the prepit level detection signal $PP_D$ can be preferably obtained.

Further, the amplitude levels of the read signals $R_a$ to $R_d$ are matched by the variable gain amplifiers 65, 69, 73, and 76. That is, the amplitude levels of the read signals $R_a$ to $R_d$ are detected by the amplitude detecting circuits 68, 71, 75, and 78 and the amplitude levels are adjusted by the variable gain amplifiers 65, 69, 73, and 76 so that those amplitude levels are substantially equal to the reference value REF, thereby reducing the amplitude level difference of the read signals.

According to the phase correction and amplitude level adjustment as mentioned above, even if the phases and the amplitude levels of a plurality of read signals $R_a$ to $R_d$ supplied from the photoelectric converting elements 20a to 20d are not equal to each other, respectively, the prepit level can be preferably detected on the basis of those read signals.

The embodiment has been described by way of an example in which the phase of the read signal $R_a$ is used as a reference and the phases of the other read signals $R_b$ to $R_d$ are matched therewith by fixing the delay amount of the variable delay circuit 61. It is, however, needless to mention that any of the read signals $R_b$ to $R_d$ can be used as the read signal for setting the phase reference.

Although the first phase detecting circuit 66 and second phase detecting circuit 72 are used to perform the phase correction in the embodiment, the phase correction can be performed without using them. For example, after the differential value SB generated from the subtractor 52 was rectified and the upper wave was detected, the signal is integrated and the delay amounts of the variable delay circuits 62 and 64 are adjusted so as to minimize the integrated value. When the integrated value becomes the minimum, the noise components multiplexed into the differential value SB become the minimum. As an example of the specific operation, it is possible to adjust only the variable delay circuit 62 so as to reduce the integration value and, thereafter, adjust the variable delay circuit 64 so as to further decrease the integration value.

It is not necessary to always execute the control of the delay amount for the variable delay circuits 62 to 64 as mentioned above and the gain control for the variable gain amplifiers 65, 69, 73, and 76 during the operation of the disc player. For example, it is possible to start those controls at a timing of the exchanging operation of the recording disc 1 or the like and execute only for a predetermined period, or it is also possible for the operator to manually execute those controls only once as an adjustment upon shipping of the product of the disc player.

Generally, the recording is performed on a recording disk in such a manner that the probability of appearance is higher for pits having relatively short pit lengths in a range of a pit length specified by the format. For example, when a specified pit length range is 3T to 11T, pits having relatively short pit lengths such as 3T and 4T in the specified pit length range are recorded on the recording disc more frequently than pits having relatively long pit lengths. On the other hand, when reading the pit of a short pit length such as 3T or 4T, the waveform of the read signal becomes closer to a sinusoidal wave as compared with pits of longer pit lengths. If the waveform of the read signal is a sinusoidal wave, even if the read signals between which a phase difference exists are added, its summation result becomes a sinusoidal wave in accordance with the characteristics of the sinusoidal wave. Therefore, the phase matching and the amplitude level matching can be realized by performing the processes by the variable delay circuits and the variable gain amplifiers on the signals (Ra+Rd, Rb+Rc) after the addition of the read signals.

Figure 9:
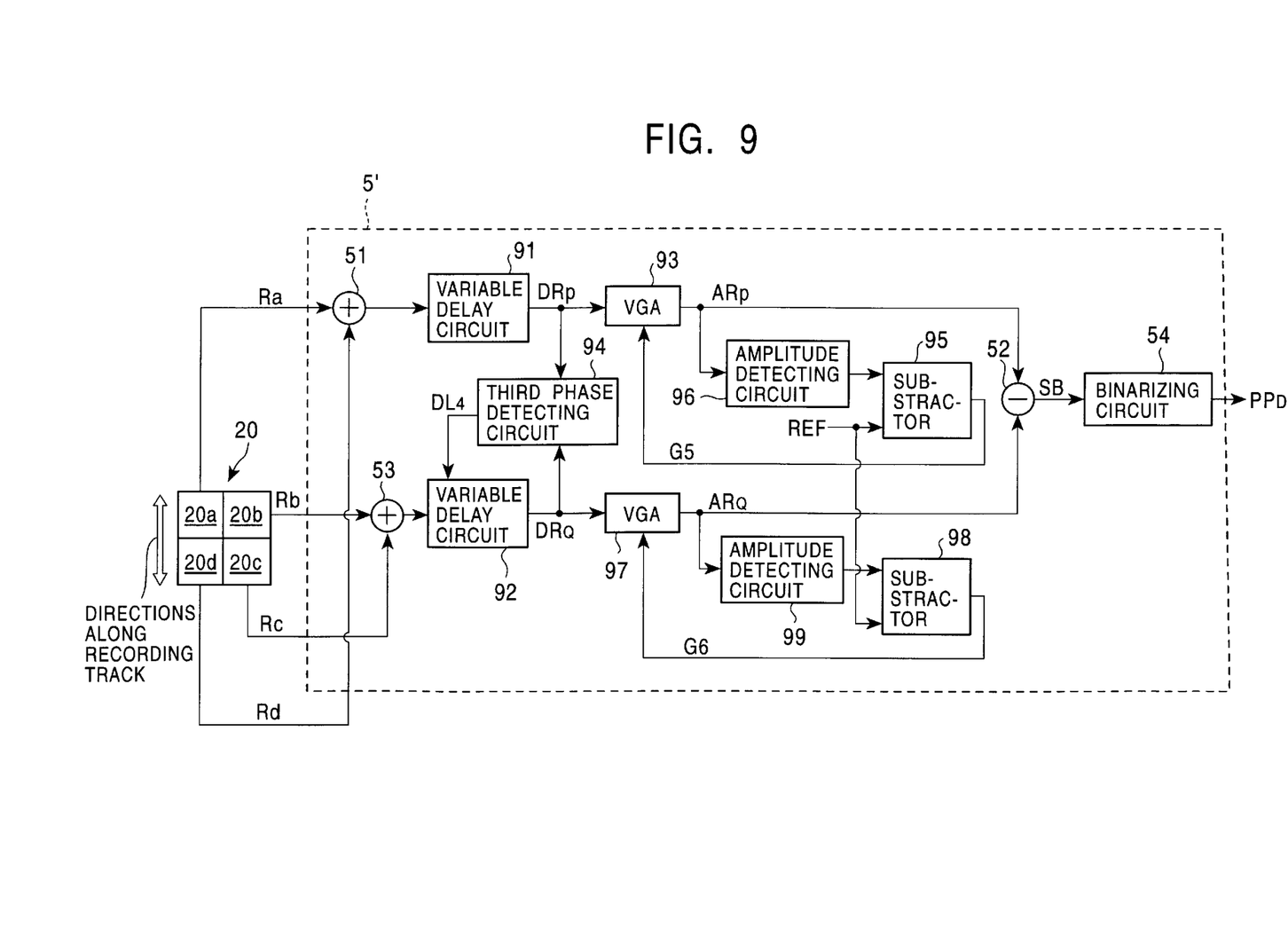
FIG. 9 is a diagram showing an internal structure of the prepit detecting circuit 5 according to another embodiment of the invention.

FIG. 9 is a diagram showing another embodiment of the prepit detecting circuit 5 made in consideration of the above points.

In FIG. 9, the adder 51 adds the read signals $R_a$ and $R_d$ from the independent photoelectric converting elements 20a and 20d, obtains the summed read signal (Ra+Rd), and supplies it to a variable delay circuit 91. The adder 53 adds the read signals $R_b$ and $R_c$ from the independent photoelectric converting elements 20b and 20c, obtains the summed read signal ($R_b+R_c$), and supplies it to a variable delay circuit 92.

The variable delay circuit 91 delays the summed read signal ($R_a+R_d$) by a predetermined time and supplies a resultant signal as a delayed read signal $DR_P$ to each of a variable gain amplifier 93 and a third phase detecting circuit 94.

The variable gain amplifier 93 adjusts an amplitude level by amplifying the delayed read signal $DR_P$ at a gain according to an amplitude error value G5 supplied from a subtractor 95, which will be explained later, and supplies the resultant signal as an amplitude adjustment read signal $AR_P$ to each of the subtractor 52 and an amplitude detecting circuit 96. The amplitude detecting circuit 96 successively detects a maximal value and a minimal value in the amplitude adjustment read signal $AR_P$ and supplies an amplitude level (amplitude level of the amplitude adjustment read signal $AR_P$) obtained by a difference between them to the subtractor 95. By subtracting the predetermined reference value REF from the amplitude level, the subtractor 95 obtains an amplitude error for the reference value REF and supplies it as an amplitude error value G5 to the variable gain amplifier 93.

That is, the variable gain amplifier 93 performs the adjustment of the amplitude level for the delayed read signal $DR_P$ so that the amplitude level of the amplitude adjustment read signal $AR_P$ is always substantially equal to the reference value REF.

The variable delay circuit 92 delays the summed read signal ($R_b+R_c$) by a time corresponding to a delay time signal $DL_4$ supplied from the third phase detecting circuit 94 and supplies a resultant signal as a delayed read signal $DR_Q$ to each of a variable gain amplifier 97 and the third phase detecting circuit 94. The third phase detecting circuit 94 detects a phase difference between the delayed read signals $DR_P$ and $DR_Q$ and generates a signal corresponding to the detected phase difference as a delay time signal $DL_4$.

That is, the variable delay circuit 92 operates as phase correcting means for delaying the summed read signal ($R_b+R_c$) by a time corresponding to the delay time signal $DL_4$, thereby correcting a phase deviation occurring between the delayed read signals DRand $DR_Q$.

The variable gain amplifier 97 adjusts an amplitude level by amplifying the delayed read signal $DR_Q$ by a gain according to an amplitude error value G6 supplied from a subtractor 98, which will be explained later, and supplies the resultant signal as an amplitude adjustment read signal $AR_Q$ to each of the subtractor 52 and an amplitude detecting circuit 99. The amplitude detecting circuit 99 successively detects a maximal value and a minimal value in the amplitude adjustment read signal $AR_Q$ and supplies an amplitude level (amplitude level of the amplitude adjustment read signal $AR_Q$) obtained by a difference between them to the subtractor 98. By subtracting the predetermined reference value REF from the amplitude level, the subtractor 98 obtains an amplitude error for the reference value REF and supplies it as an amplitude error value G6 to the variable gain amplifier 97.

That is, the variable gain amplifier 97 adjusts the amplitude level for the delayed read signal $DR_Q$ so that the amplitude level of the amplitude adjustment read signal $AR_Q$ is always equal to the reference value REF.

The subtractor 52 subtracts the amplitude adjustment read signal $AR_P$ from the amplitude adjustment read signal $AR_Q$, obtains a differential value, and supplies it as a differential value SB to the binarizing circuit 54. The binarizing circuit 54 binarizes the differential value SB on the basis of a predetermined threshold value and generates it as a prepit detection signal $PP_D$.

According to the construction shown in FIG. 9, since it is sufficient to use two systems of the circuit system for performing the phase correction and the amplitude level correction as shown in the diagram, its construction can be simplified than that of FIG. 8.

According to the prepit detecting circuit of the invention as described above, even if the phases or amplitude levels of a plurality of read signals read out from the recording disc are deviated from each other, the prepits which have previously been recorded on the recording disc can be detected on the basis of each of the read signals.

What is claimed is:

1. A disc player comprising:
    reading means for obtaining a read signal by reading recording information from a recording disc; and a prepit detecting circuit for detecting prepits which have previously been formed on said recording disc on the basis of said read signal and generating a prepit detection signal,
        wherein said reading means includes first and second reading elements arranged in two regions divided along the direction of recording tracks of said recording disc, and
    said prepit detecting circuit is constructed by
        phase detecting means for detecting a phase difference between a first read signal read out by said first reading element and a second read signal read out by said second reading element,
        phase correcting means for obtaining a first phase correction read signal by correcting the phase of said first read signal by an amount corresponding to said phase difference, and
        a subtractor for generating a differential value between said first phase correction read signal and said second read signal as said prepit detection signal.

2. A player according to claim 1, further comprising level adjusting means for adjusting an amplitude level of each of said first phase correction read signal and said second read signal so as to reduce a difference between the amplitude levels of said first phase correction read signal and said second read signal.

3. A disc player comprising: reading means for obtaining a read signal by reading recording information from a recording disc; and a prepit detecting circuit for detecting prepits which have previously been formed on said recording disc on the basis of said read signal and generating a prepit detection signal,
    wherein said reading means includes first and second reading elements arranged in two regions divided along the direction of recording tracks of said recording disc, and
    said prepit detecting circuit is constructed by
        a first delay circuit for obtaining a first delayed read signal by delaying a first read signal read out by said first reading element by a predetermined time,
        a second delay circuit for obtaining a second delayed read signal by delaying a second read signal read out by said second reading element by a time according to a delay time signal,
        a phase detecting circuit for detecting a phase difference between said first delayed read signal and said second delayed read signal and generating a signal corresponding to said phase difference as said delay time signal, and
        a subtractor for generating a differential value between said first delayed read signal and said second delayed read signal as said prepit detection signal.

4. A player according to claim 3, further comprising:
    a first amplitude detecting circuit for obtaining a first amplitude level signal by detecting an amplitude level of said first delayed read signal;
    a first subtractor for obtaining a difference between said first amplitude level signal and a reference amplitude level as a first amplitude error signal;
    a first amplifier for amplifying an amplitude of said first delayed read signal by a gain according to said first amplitude error signal;
    a second amplitude detecting circuit for obtaining a second amplitude level signal by detecting an amplitude level of said second delayed read signal;
    a second subtractor for obtaining a difference between said second amplitude level signal and said reference amplitude level as a second amplitude error signal; and
    a second amplifier for amplifying an amplitude of said second delayed read signal by a gain according to said second amplitude error signal.

5. A disc player comprising: reading means for obtaining a read signal by reading recording information from a recording disc; and a prepit detecting circuit for detecting prepits which have previously been formed on said recording disc on the basis of said read signal and generating a prepit detection signal, wherein said reading means includes first to fourth reading elements arranged in four regions obtained by dividing into two regions along the direction of recording tracks of said recording disc and, further, dividing into two regions along the direction perpendicular to the direction of said recording tracks, respectively, said prepit detecting circuit is constructed by a first delay circuit for obtaining a first delayed read signal by delaying a first read signal read out by said first reading element by a predetermined time, a second delay circuit for obtaining a second delayed read signal by delaying a second read signal read out by said second reading element by a time corresponding to a first delay time signal, a third delay circuit for obtaining a third delayed read signal by delaying a third read signal read out by said third reading element by a time corresponding to a second delay time signal, a fourth delay circuit for obtaining a fourth delayed read signal by delaying a fourth read signal read out by said fourth reading element by a time corresponding to a third delay time signal, a first phase detecting circuit for detecting a phase difference between said first delayed read signal and said second delayed read signal and generating a signal according to said phase difference as said first delay time signal, a second phase detecting circuit for detecting a phase difference between said third delayed read signal and said fourth delayed read signal and generating a signal according to said phase difference as said third delay time signal, a first adder for obtaining a first summed read signal by adding said first delayed read signal and said fourth delayed read signal, a second adder for obtaining a second summed read signal by adding said second delayed read signal and said third delayed read signal, a subtractor for generating a differential value between said first summed read signal and said second summed read signal as said prepit detection signal, and a peak level detecting circuit for detecting a peak level of said differential value and generating a signal corresponding to said peak level as said second delay time signal.

6. A player according to claim 5, further comprising:

a first amplitude detecting circuit for obtaining a first amplitude level signal by detecting an amplitude level of said first delayed read signal;

a first subtractor for obtaining a difference between said first amplitude level signal and a reference amplitude level as a first amplitude error signal;

a first amplifier for amplifying an amplitude of said first delayed read signal by a gain according to said first amplitude error signal;

a second amplitude detecting circuit for obtaining a second amplitude level signal by detecting an amplitude level of said second delayed read signal;

a second subtractor for obtaining a difference between said second amplitude level signal and said reference amplitude level as a second amplitude error signal;

a second amplifier for amplifying an amplitude of said second delayed read signal by a gain according to said second amplitude error signal;

a third amplitude detecting circuit for obtaining a third amplitude level signal by detecting an amplitude level of said third delayed read signal;

a third subtractor for obtaining a difference between said third amplitude level signal and said reference amplitude level as a third amplitude error signal;

a third amplifier for amplifying an amplitude of said third delayed read signal by a gain according to said third amplitude error signal;

a fourth amplitude detecting circuit for obtaining a fourth amplitude level signal by detecting an amplitude level of said fourth delayed read signal;

a fourth subtractor for obtaining a difference between said fourth amplitude level signal and said reference amplitude level as a fourth amplitude error signal; and a fourth amplifier for amplifying an amplitude of said fourth delayed read signal by a gain according to said fourth amplitude error signal.

7. A disc player comprising: reading means for obtaining a read signal by reading recording information from a recording disc; and a prepit detecting circuit for detecting prepits which have previously been formed on said recording disc on the basis of said read signal and generating a prepit detection signal, wherein said reading means includes first and second reading elements arranged in two regions divided along the direction of recording tracks of said recording disc, and said prepit detecting circuit is constructed by level adjusting means for obtaining a first amplitude adjustment read signal and a second amplitude adjustment read signal by adjusting an amplitude level of each of a first read signal read out by said first reading element and a second read signal read out by said second reading element so as to reduce a difference between the amplitude levels of said first read signal and said second read signal, and a subtractor for generating a differential value between said first amplitude adjustment read signal and said second amplitude adjustment read signal as said prepit detection signal.

* * * * *